US008864987B2

(12) United States Patent
Long et al.

(10) Patent No.: US 8,864,987 B2
(45) Date of Patent: Oct. 21, 2014

(54) MECHANICALLY AGITATED, INNER CIRCULATION REACTOR FOR RESIN ION EXCHANGE AND ADSORPTION

(75) Inventors: Chao Long, Jiangsu (CN); Jun Fan, Jiangsu (CN); Aimin Li, Jiangsu (CN); Chendong Shuang, Jiangsu (CN)

(73) Assignees: Nanjing University (CN); Nanjing University Yancheng Environmental Protection Technology and Engineering Research Institute (CN)

( * ) Notice: Subject to any disclaimer, the term of this patent is extended or adjusted under 35 U.S.C. 154(b) by 0 days.

(21) Appl. No.: 14/117,194

(22) PCT Filed: Nov. 10, 2011

(86) PCT No.: PCT/CN2011/082009
§ 371 (c)(1),
(2), (4) Date: Nov. 12, 2013

(87) PCT Pub. No.: WO2012/155466
PCT Pub. Date: Nov. 22, 2012

(65) Prior Publication Data
US 2014/0209527 A1    Jul. 31, 2014

(30) Foreign Application Priority Data

May 16, 2011   (CN) .......................... 2011 1 0125912

(51) Int. Cl.
*C02F 1/42*   (2006.01)
*B01J 47/10*   (2006.01)
(Continued)

(52) U.S. Cl.
CPC ............. *C02F 1/42* (2013.01); *C02F 2001/007* (2013.01); *B01J 47/10* (2013.01);
(Continued)

(58) Field of Classification Search
CPC .......... B01J 8/1854; B01J 8/20; B01J 41/085; B01J 47/10; B01J 47/007; B01J 49/0026; B01J 49/0034; B01J 47/06; B01J 47/022; C02F 1/42; C02F 2001/422; C02F 2101/308; C02F 2101/16; C02F 2101/105; C02F 2103/30; C02F 1/28; C02F 2001/007; C02F 2303/16

USPC ......... 210/189, 208, 265, 280, 661, 676, 679, 210/269; 422/140, 147, 227

See application file for complete search history.

(56) References Cited

U.S. PATENT DOCUMENTS 3,084,120 A * 4/1963 Cecil et al. .................... 210/676
8,758,608 B2 * 6/2014 Long et al. .................... 210/189

FOREIGN PATENT DOCUMENTS

CN         201321393 Y    10/2009
CN         101708876 A     5/2010
(Continued)

OTHER PUBLICATIONS

International Search Report; PCT/CN2011/082009; Int'l File Date: Nov. 10, 2011; Nanjing University et al., 4 pgs.
State Intellectual Property Office of the People's Republic of China, Application No. 201110125912.8, First Office Action dated Mar. 12, 2012, 9 pgs.

*Primary Examiner* — Matthew O Savage
(74) *Attorney, Agent, or Firm* — Schmeiser, Olsen & Watts, LLP

(57) ABSTRACT

Disclosed is an internal circulation resin ion exchange adsorption reactor with a mechanical stirrer. The upper part ⅔~⅘ of the reactor main body is an open cylinder and the lower part ⅕~⅓ is a cone-shaped body with a slope of 30°±10°. A bell-jar shaped reaction slot with a turbine water stirrer inside is located in the center of the reactor main body. The reactor main body is equipped with a cylindrical guide plate. A water collection weir, an inclined tube separator and an annular resin collection hopper are located between the shell of the reactor main body and the guide plate. The reactor is equipped with a water inlet pipe and a water outlet pipe. A resin removal pipe is connected with the annular resin collection hopper and a resin desorption slot respectively, and a regenerated resin reflux pipe is connected to the bell-jar shaped reaction slot.

7 Claims, 1 Drawing Sheet

(51) Int. Cl.
*B01J 47/02* (2006.01)
*C02F 1/28* (2006.01)
*B01J 47/06* (2006.01)
*B01J 49/00* (2006.01)

(52) U.S. Cl.
CPC ... *C02F 1/00* (2006.01) *B01J 47/022* (2013.01); *C02F 1/28* (2013.01); *B01J 47/06* (2013.01); *B01J 49/0026* (2013.01); *C02F 2303/16* (2013.01)

USPC .......... 210/189; 210/208; 210/265; 210/269

(56) References Cited

FOREIGN PATENT DOCUMENTS

| | | | | | |
|---|---|---|---|---|---|
| CN | 101905931 A | | 12/2010 | | |
| CN | 102219284 A | | 10/2011 | | |
| DE | 1290118 B | * | 3/1969 | ............... | B01J 47/10 |
| JP | 2010036130 A | | 2/2010 | | |
| WO | WO 9204114 A | * | 3/1992 | ............... | B01J 47/10 |
| WO | 2004020349 A1 | | 3/2004 | | |

\* cited by examiner

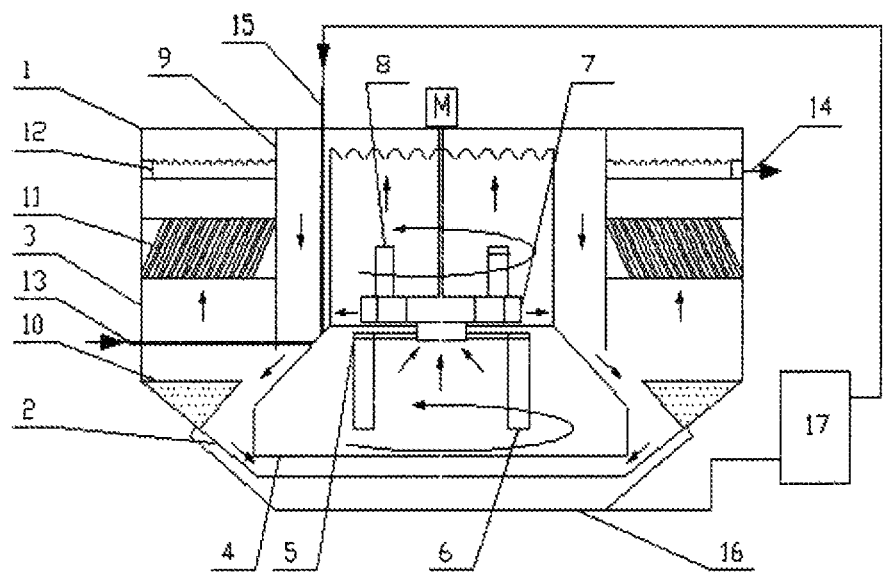

MECHANICALLY AGITATED, INNER CIRCULATION REACTOR FOR RESIN ION EXCHANGE AND ADSORPTION

FIELD OF TECHNOLOGY

The present invention relates to a device for ion exchange and adsorption, specifically to a device adopting mechanic agitation and inner circulation for ion exchange and adsorption, particularly to a mechanically agitated, inner circulation reactor for ion exchange and adsorption by using 75-200 μm solid or magnetic powder resin; it belongs to the field of water treatment.

BACKGROUND

In advanced treatment of supply water, wastewater and biochemical effluent, ion exchange and adsorption resin is widely adopted to concentrate organics and inorganics, and then separate them from water so that the objectives of water treatment, such as decolorization, deodorization, softening and removal of trace organics or heavy metals can be obtained. However, the resin ion exchange devices currently used in this field have many defects, such as complicated pretreatment procedures, large resin consumption, large equipment investment and high operating cost; in addition, it is difficult to realize continuous treatment with one single device, and a large amount of resin regeneration fluid is required due to the poor regeneration efficiency. The appearance of a new type of resin makes it possible to overcome these defects. This so-called powder resin refers to a (magnetic) solid material made of acrylic polymer with 75-200 μm in size. It has rich porous structure and ionic groups and therefore bears such functions as electrochemical adsorption and ion exchange simultaneously; many new types of (magnetic) powder resin have smaller particle size, larger specific surface area and better kinetic performance. In practical application, the powder resin is often firstly mixed with wastewater through agitation for a period of time, and then separated from the water so that it can remove the organics and inorganics from the wastewater through exchange and adsorption. Reactors adopting powder resin in water treatment presents such advantages as shorter treatment time, lower consumption of resin, higher anti-pollution performance, longer service life and smaller amount of desorption fluid. But, since the (magnetic) powder resin has smaller particle size and lower relative density, the adoption of traditional fixed beds or suspension beds will cause strong bed resistance, jamming or even break-up of resin particles, and when conducting the backwash procedure, the resin tends to be brought out of the reactor; in addition, as a single fixed bed or suspension bed cannot realize continuous operation of the powder resin, it severely damages the powder resin's performance in water treatment. Therefore, it is of great necessity to develop a new resin reactor that gives full consideration to the properties of the (magnetic) powder resin, such as smaller particle size, lower density and better kinetic performance, so that it can bring the advantages of this new type of resin into full play.

Currently, MIEX® resin and its application method developed by Orica Company of Australia have been extensively used in water advanced treatment. It adopts acrylic strong basic ion exchange resin to separate a variety of anions (including nitrates, sulfates, phosphates, arsenates) and soluble organic pollutants from water by means of mechanic agitation and inclined pipe separation. In China, a hydraulic jetting magnetic resin reactor developed by Nanjing CEC Environmental Protection Co., Ltd also appeared on the market of advanced water treatment. However, traditional continuous-stirred reactors are used in both cases, which leads to homogeneous distribution of resin within the whole reactor. As a result, in both cases, the consumption of resin is very large and the recovery of resin is difficult. It is of great necessity to develop a new reactor that can overcome these defects.

SUMMARY

In view of the fact that the (magnetic) powder resin has such properties as small particle size, low density and special kinetic performance, the present invention provides a mechanically agitated, inner circulation reactor for resin ion exchange and adsorption; it can fully exploit the advantages of the (magnetic) powder resin and reach a continuous separation-regeneration mode of operation for the reaction system. The reactor is particularly suitable for advanced treatment of supply water, wastewater, biochemical effluent and reclaimed water by using (magnetic) powder resin.

The present invention provides a mechanically agitated, inner circulation reactor for resin ion exchange and adsorption; the upper $2/3 \sim 4/5$ part of the reactor is a cylinder with an open upper end while the lower $1/5 \sim 1/3$ part of the reactor is an cone with a slope of $30° \pm 10°$; in the middle of the reactor is a bell-type reaction tank, which is equipped with a turbine water-lifting agitator; a cylindric guide plate is also designed within the reactor; between the guide plate and the main body casing of the reactor are installed with an outlet weir and an inclined pipe separator; at the lower part of the same space (between the guide plate and the main body casing of the reactor) stands a circular resin-collecting sump; an inlet pipe extends into the reactor and stops near a conical frustum, the lower part of the bell-type reaction tank; an outlet pipe is designed near the outlet weir; there is a resin discharge pipe connecting the circular resin-collecting sump and the resin desorption tank together, and a return pipe that channels the regenerated resin back into the lower part of the bell-type tank also stop near the conical frustum.

The said bell-type reaction tank is a hollow rotary assembly concentric with the reactor's main body; its upper $1/3 \sim 1/2$ part is a hollow cylinder and its lower $1/2 \sim 1/3$ part is a hollow conical frustum; the bottom of the bell-type reaction tank is 0.2~0.8 m above the bottom of the reactor's main body, while its top is 0.5~1.0 m below the top of the reactor's main body; the diameter of the hollow cylinder of the bell-type reaction tank is $1/5 \sim 1/3$ of the diameter of the reactor's main body, so is the diameter of the upper end of the conical frustum; the diameter of the lower end of the conical frustum is $1/4 \sim 1/2$ of the diameter of the reactor's main body; there is a baffle plate between the hollow cylinder and the conical frustum; a hole is punched out at the center of the baffle plate and its diameter is $1/4 \sim 1/2$ of the diameter of the hollow cylinder.

The said turbine water-lifting agitator equipped in the bell-type reaction tank consists of a turbine, an upper agitating propeller and a lower agitating propeller; the rotation rate of the agitator is 2~50 rpm; the diameter of the turbine is $1/4 \sim 1/3$ of the diameter of the hollow cylinder of the bell-type reaction tank; both the upper agitating propeller and the lower agitating propeller consist of 2~6 blades; the linear velocity at the edge of the turbine is 0.1~1.5 m/s and the linear velocity at the tip of the blade is 0.2~2.0 m/s.

The said guide plate is a hollow cylinder concentric with the reactor's main body; its diameter is $1/2 \sim 3/4$ of the diameter of the reactor's main body; its upper end shares the same horizontal level with that of the reactor's main body, and its lower end is 1.5~2.5 m above the bottom of the reactor; the guide plate can change the flow direction of water coming out of the bell-type reaction tank and help the resin to precipitate at the bottom of the reactor.

The said outlet weir consists of 4~12 weir units, installed like wheel spokes between the main body casing of the reactor and the guide plate; it is 0.3~0.5 m below the upper end of the reactor, and the weir units can be designed in serrated or perforated form.

The said inclined pipe separator consists of a multiplicity of inclined pipes installed between the main body casing of the reactor and the guide plate, 1.5~3.5 m below the upper end of the reactor; the diameter of each inclined pipe is 50~80 mm; each pipe has a 45°~60° inclination angle and is 0.8 m~1.2 m in length; the inclined pipes can be made with polypropylene (PP), unplasticized polyvinyl chloride (UPVC), polyethylene (PE) or fiber-reinforced plastic and their surface loading rate is 3~6 $m^3/(m^2 \cdot h)$;

The said circular resin-collecting sump is 0.5~2.0 m above the bottom of the reactor; it is 0.5~1.0 m in height, and its width at the upper end is ⅛~¼ of the diameter of the reactor's main body.

In comparison with the prior art, the present invention has following beneficial effects:

(1) the design of the reactor is particularly suitable for the ion exchange and adsorption using (magnetic) powder resin as it has taken into full consideration all potential advantages of this type of resin;

(2) the intensity of contact reaction between (magnetic) powder resin and water as well as the volume of the inner circulation are adjustable by means of changing the rotation rate of the turbine water-lifting agitator and the inflow volume;

(3) the special design of this reactor can maintain most of (magnetic) powder resin within the bell-type reaction tank, which ensures sufficient contact between resin and water; as a result, it requires less reaction time and resin consumption; in addition, this design increases the treatment capacity of the whole system and reduces its occupation space as well;

(4) the manufacturing cost of the reactor disclosed in the present invention keeps at a low level as the reactor is a open container working under the normal pressure, and it can be made with metals, organic composite materials or steel-reinforced concrete;

(5) the operating cost of the reactor disclosed in the present invention keeps at a low level as its high efficiency in separating (magnetic) powder resin from water guarantees a lower loss rate of resin;

(6) the reactor works in an continuous way; the deactivated resin can be discharged out for regeneration and the regenerated resin can also flow back to the reactor without turning off the whole treatment system; the efficiency of the whole system is therefore greatly increased;

(7) the design of the whole reactor is simple, requiring no complicated inflow pipelines or backwash pipelines; it is easy and convenient to operate the reactor as it works in an automatic way.

BRIEF DESCRIPTION

FIG. 1 is the structural diagram of the mechanically agitated, inner circulation reactor for ion exchange and adsorption disclosed in the present invention, including:

reactor main body 1, conical lower part 2, cylindrical upper part 3, bell-type reaction tank 4, turbine water-lifting agitator 5, lower agitating propeller 6, turbine 7, upper agitating propeller 8, guide plate 9, circular resin-collecting sump 10, inclined pipe separator 11, outlet weir 12, inlet pipe 13, outlet pipe 14, return pipe for regenerated resin 15, resin discharge pipe 16, and resin desorption tank 17.

DETAILED DESCRIPTION

The present invention is more specifically described in the following paragraphs by reference to the drawings attached.

A mechanically agitated, inner circulation reactor for resin ion exchange and adsorption provided in the present invention, wherein the upper part of its main body 1 is a cylinder 3 with an open upper end and its lower part is a cone 2. In the middle of the main body 1 is a bell-type reaction tank 4, which is a hollow rotary assembly concentric with the main body 1; its upper part is a hollow cylinder and its lower part is a hollow conical frustum; there is a baffle plate between the hollow cylinder and the conical frustum, and at the center of the baffle plate is a punched hole; the bell-type reaction tank is equipped with a turbine water-lifting agitator 5, consisting of a turbine 7, an upper agitating propeller 8 and a lower agitating propeller 6; The guide plate 9 is a hollow cylinder concentric with the main body 1 of the reactor. Between the guide plate 9 and the casing of the main body 1 are installed with an outlet weir 12 and an inclined pipe separator 11; the units of the outlet weir 11 are installed like wheel spokes between the casing of the main body 1 and the guide plate 9; an outlet pipe 14 is designed near the outlet weir 12. A circular resin-collecting sump 10 stands between the guide plate 9 and lower part of the casing of the reactor's main body 1. An inlet pipe 13 extends into the reactor and stops near the conical frustum, the lower part of the bell-type reaction tank 4; there is a resin discharge pipe 16 connecting the circular resin-collecting sump 10 and the resin desorption tank 17 together, and a return pipe 15 that channels the regenerated resin back into the lower part of the bell-type tank 4 also stop near the conical frustum.

The mechanically agitated, inner circulation reactor for resin ion exchange and adsorption disclosed in the present invention works in the following ways: filling in the bell-type reaction tank 4 with 75~200 μm (magnetic) powder resin; the volume of the (magnetic) powder resin is 2~15% of the total volume of the bell-type reaction tank 4; introducing the inflow water into the lower conical frustum part of the bell-type reaction tank 4 through the inlet pipe 14; under the agitation of the agitating propellers, the (magnetic) powder resin at the bottom of the reactor's main body 1 is sufficiently mixed with the inflow water; the mixture, driven by the turbine 7 in the bell-type reaction tank 4, is lifted up into the upper cylindrical part of the bell-type reaction tank 4; both organic and inorganic substances in the water are adsorbed upon the surface of resin through ion exchange and adsorption reaction; both the intensity of mixing reaction within the bell-type reaction tank 4 and the flow rate of the rising liquid in the bell-type reaction tank 4 are adjustable by means of changing the rotation rate of the turbine water-lifting agitator 5;

the guide plate 9 in the main body 1 of the reactor leads the resin-water mixture flowing out of the bell-type reaction tank 4 into the lower part of the main body 1, so that the resin can quickly precipitate there and flow back into the bell-type reaction tank again; the inclined pipe separator 11 installed between the casing of the main body 1 and the guide plate 9 can further promote the precipitation of resin from the water; the outflow water goes up to the top of the main body 1, where it is collected and then discharged out by the outlet weir 12 installed between the casing of the main body 1 and the guide plate 9; the deactivated resin is collected by the circular resin-collecting sump 10 in the lower part of the reactor and is pumped into the resin desorption tank 17 for regeneration; the regenerated resin is then channeled back into the bell-type reaction tank 4 through the return pipe 15.

The present invention is more specifically described in the following paragraphs by way of example.

Embodiment 1

A mechanically agitated, inner circulation reactor for resin ion exchange and adsorption provided in the present invention, wherein the upper ⅔ part of its main body 1 is a cylinder 3 with an open upper end and its lower ⅓ part is a cone 2 with a slope of 20°; the main body 1 of the reactor is made with steel.

The upper ⅓ part of the bell-type reaction tank 4 is a hollow cylinder and its lower ⅔ part is a hollow conical frustum; the bottom of the bell-type reaction tank 4 is 0.2 m above the bottom of the reactor's main body 1, while its top is 0.5 m below the top of the reactor's main body 1; the diameter of the hollow cylinder of the bell-type reaction tank 4 is ⅕ of the reactor's outer diameter, so is the diameter of the upper end of the conical frustum; the diameter of the lower end of the conical frustum is ¼ of the reactor's outer diameter; there is a baffle plate between the hollow cylinder and the conical frustum; a hole is punched out at the center of the baffle plate and its diameter is ¼ of the diameter of the hollow cylinder;

the rotation rate of the agitator equipped in the bell-type reaction tank 4 is 10 rpm; the diameter of the turbine 7 is ¼ of the diameter of the hollow cylinder of the bell-type reaction tank 4; both the upper agitating propeller 8 and the lower agitating propeller 6 consist of 2 blades, the linear velocity at the edge of the turbine is 0.5 m/s and the linear velocity at the tip of the blade is also 0.5 m/s;

the diameter of the guide plate 9 in the main body 1 of the reactor is ½ of the reactor's outer diameter; the upper end of the guide plate 9 shares the same horizontal level with the upper end of the main body 1, and the lower end of the guide plate 9 is 1.5 m above the bottom of the main body 1; the outlet weir 12 consists of 12 weir units, installed like wheel spokes between the casing of the main body 1 and the guide plate 9; it is 0.3 m below the upper end of the main body 1, and the weir units are designed in serrated form; the inclined pipe separator 11 consists of a multiplicity of inclined pipes installed between the casing of the main body 1 and the guide plate 9, 1.5 m below the upper end of the main body 1; the diameter of each inclined pipe is 50 mm; each pipe has a 45° inclination angle and is 0.8 m in length; the inclined pipes are made with PP material, and their surface loading rate is 3 $m^3/(m^2 \cdot h)$;

the circular resin-collecting sump 10 is 0.5 m above the bottom of the reactor; it is 0.5 m in height, and its width at the upper end is ⅛ of the diameter of the reactor's main body 1; the inlet pipe 13 extends into the reactor and stops near the conical frustum, the lower part of the bell-type reaction tank 4; the outlet pipe is designed near the outlet weir; the resin discharge pipe 16 connects to the circular resin-collecting sump 10 and the resin desorption tank 17 respectively, and the return pipe 15 that channels the regenerated resin back into the lower part of the bell-type tank 4 also stop near the conical frustum. The reactor disclosed in this embodiment was adopted for advanced treatment of biochemical effluent created by a dyeing plant; the water quality before being treated with (magnetic) powder resin and the treatment volume are shown in the following table 1:

TABLE 1

| water quality before treatment and treatment volume | | | | | |
|---|---|---|---|---|---|
| | CODcr (mg/L) | total nitrogen (mg/L) | total phosphorus (mg/L) | chromaticity (times) | inflow volume ($m^3/h$) |
| biochemical effluent | 80~90 | 10~15 | 0.3~0.5 | 60~80 | 300 |

The said effluent was first mixed with the regenerated resin and then introduced into the bell-type reaction tank 4 of the reactor; the filling volume of the powder resin was 5% of the total volume of the bell-type reaction tank 4; the retention time of the effluent in the bell-type reaction tank 4 was 30 min; adjusting the rotation rate of the agitator to ensure sufficient contact between the resin and the effluent; meanwhile, keeping the flow rate of the liquid flowing out of the upper end of the bell-type reaction tank 4 at 3 m/h.

The resin collected by the circular resin-collecting sump 10 was channeled out through the discharge pipe 16 to the desorption 17, where the resin was dynamically regenerated by 10% NaCl solution; the regenerated resin was then introduced back into the bell-type reaction tank 4; the regeneration rate of the resin was controlled at 10% of its total volume in the reactor; keeping the amount of resin channeled back the same with that discharged out. The treatment result is shown in table 2.

TABLE 2

| water quality after treatment | | | | |
|---|---|---|---|---|
| | CODcr (mg/L) | total nitrogen (mg/L) | total phosphorus (mg/L) | chromaticity (times) |
| biochemical effluent | 40~45 | 5~10 | 0.2~0.3 | 5~10 |

Embodiment 2

A mechanically agitated, inner circulation reactor for resin ion exchange and adsorption provided in the present invention, wherein the upper ⅘ part of its main body 1 is a cylinder 3 with an open upper end and its lower ⅕ part is a cone 2 with a slope of 30°; the main body 1 of the reactor is made with steel.

The upper ½ part of the bell-type reaction tank 4 is a hollow cylinder and its lower ½ part is a hollow conical frustum; the bottom of the bell-type reaction tank 4 is 0.6 m above the bottom of the reactor's main body 1, while its top is 0.8 m below the top of the reactor's main body 1; the diameter of the hollow cylinder of the bell-type reaction tank 4 is ¼ of the reactor's outer diameter, so is the diameter of the upper end of the conical frustum; the diameter of the lower end of the conical frustum is ⅓ of the reactor's outer diameter; there is a baffle plate between the hollow cylinder and the conical frustum; a hole is punched out at the center of the baffle plate and its diameter is ⅓ of the diameter of the hollow cylinder.

the rotation rate of the agitator equipped in the bell-type reaction tank 4 is 35 rpm; the diameter of the turbine 7 is ⅓ of the diameter of the hollow cylinder of the bell-type reaction tank 4; both the upper agitating propeller 8 and the lower agitating propeller 6 consist of 4 blades, the linear velocity at the edge of the turbine is 1.0 m/s and the linear velocity at the tip of the blade is also 1.0 m/s;

the diameter of the guide plate 9 in the main body 1 of the reactor is ⅔ of the reactor's outer diameter; the upper end of the guide plate 9 shares the same horizontal level with the upper end of the main body 1, and the lower end of the guide plate 9 is 2.0 m above the bottom of the main body 1; the outlet weir 12 consists of 8 weir units, installed like wheel spokes between the casing of the main body 1 and the guide plate 9; it is 0.4 m below the upper end of the main body 1, and the weir units are designed in perforated form; the inclined pipe separator 11 consists of a multiplicity of inclined pipes installed between the casing of the main body 1 and the guide plate 9, 2.5 m below the upper end of the main body 1; the diameter of each inclined pipe is 60 mm; each pipe has a 50° inclination angle and is 1.0 m in length; the inclined pipes are made with PE material, and their surface loading rate is 4 m$^3$/(m$^2$·h);

the circular resin-collecting sump 10 is 1.0 m above the bottom of the reactor; it is 0.8 m in height, and its width at the upper end is ⅙ of the diameter of the reactor's main body 1; other unmentioned parameters are the same as embodiment 1. The treatment result is also the same as table 2 indicates.

Embodiment 3

A mechanically agitated, inner circulation reactor for resin ion exchange and adsorption provided in the present invention, wherein the upper ⅘ part of its main body 1 is a cylinder 3 with an open upper end and its lower ⅕ part is a cone 2 with a slope of 40°; the main body 1 of the reactor is made with steel.

The upper ½ part of the bell-type reaction tank 4 is a hollow cylinder and its lower ½ part is a hollow conical frustum; the bottom of the bell-type reaction tank 4 is 0.8 m above the bottom of the reactor's main body 1, while its top is 1.0 m below the top of the reactor's main body 1; the diameter of the hollow cylinder of the bell-type reaction tank 4 is ⅓ of the reactor's outer diameter, so is the diameter of the upper end of the conical frustum; the diameter of the lower end of the conical frustum is ½ of the reactor's outer diameter; there is a baffle plate between the hollow cylinder and the conical frustum; a hole is punched out at the center of the baffle plate and its diameter is ½ of the diameter of the hollow cylinder.

the rotation rate of the agitator equipped in the bell-type reaction tank 4 is 45 rpm; the diameter of the turbine 7 is ⅓ of the diameter of the hollow cylinder of the bell-type reaction tank 4; both the upper agitating propeller 8 and the lower agitating propeller 6 consist of 6 blades, the linear velocity at the edge of the turbine is 1.5 m/s and the linear velocity at the tip of the blade is also 1.5 m/s;

the diameter of the guide plate 9 in the main body 1 of the reactor is ¾ of the reactor's outer diameter; the upper end of the guide plate 9 shares the same horizontal level with the upper end of the main body 1, and the lower end of the guide plate 9 is 2.5 m above the bottom of the main body 1; the outlet weir 12 consists of 10 weir units, installed like wheel spokes between the casing of the main body 1 and the guide plate 9; it is 0.5 m below the upper end of the main body 1, and the weir units are designed in perforated form; the inclined pipe separator 11 consists of a multiplicity of inclined pipes installed between the casing of the main body 1 and the guide plate 9, 3.0 m below the upper end of the main body 1; the diameter of each inclined pipe is 70 mm; each pipe has a 55° inclination angle and is 1.2 m in length; the inclined pipes are made with fiber-reinforced plastic and their surface loading rate is 5 m$^3$/(m$^2$·h);

the circular resin-collecting sump 10 is 1.8 m above the bottom of the reactor; it is 1.0 m in height, and its width at the upper end is ⅕ of the diameter of the reactor's main body 1; other unmentioned parameters are the same as embodiment 1. The treatment result is also the same as table 2 indicates.

What is claimed is:

1. A reactor for resin ion exchange and adsorption, wherein an upper ⅔ to ⅘ part of a main body (1) of the reactor is a cylinder (3) with an open upper end and a lower ⅕ to ⅓ part of the main body (1) of the reactor is cone-shaped (2) with a slope of 30°±10°; a bell-shaped shaped reaction tank (4) disposed in a center of the main body (1); a turbine water-lifting agitator (5) disposed within the bell-shaped reaction tank (4); a cylindrical guide plate (9) disposed within the main body (1) of the reactor between the cylinder (3) of the main body (1) and the bell-shaped reaction tank (4); an outlet weir (12) and an inclined pipe separator (11) disposed between the guide plate (9) and the cylinder (3) of the main body (1), wherein the outlet weir (12) is disposed above the inclined pipe separator (11); a circular resin-collecting sump (10) disposed between the cone shaped part (2) of the main body (1) and the bell-shaped reaction tank (4) and below the inclined pipe separator (11); an inlet pipe (13) extending into the main body (1) of the reactor and stopping near an exterior surface of a conical frustum shaped portion that forms a lower part of the bell-shaped reaction tank (4); an outlet pipe (14) connected to the outlet weir (12); a resin desorption tank disposed outside of the main body portion (1); a resin discharge pipe (16) connecting the circular resin-collecting sump (10) and the resin desorption tank (17) together, and a return pipe (15) that channels a regenerated resin back into the lower part of the bell-shaped reaction tank (4), the return pipe (15) extending into the main body (1) of the reactor and stopping near the exterior surface of the conical frustum shaped portion.

2. A reactor for resin ion exchange and adsorption as defined in claim 1, wherein the bell-shaped reaction tank (4) is a hollow assembly concentric with the reactor's main body (1); an upper ⅓ to ½ part of the bell-shaped reaction tank is a hollow cylinder and a lower ⅓ to ½ part is a hollow conical frustum; a bottom of the bell-shaped reaction tank (4) is 0.2 to 0.8 m above a bottom of the reactor's main body (1), while a top of the bell-shaped reaction tank is 0.5 to 1.0 m below a top of the reactor's main body (1); a diameter of the hollow cylinder of the bell-shaped reaction tank (4) is ⅕ to ⅓ of a diameter of the cylinder (3) of the reactor's main body (1); a diameter of the upper end of the conical frustum shaped portion being the same as the diameter of the hollow cylinder of the bell-shaped reaction tank (4); a diameter of a lower end of the conical frustum shaped portion of the bell-shaped reactor tank (4) being ¼ to ½ of the diameter of the cylinder (3) of the reactor's main body (1); a baffle plate horizontally disposed within the bell-shaped reaction tank (4) at the same elevation as that of a connection between the hollow cylinder and the conical frustum shaped portion of the bell-shaped reaction tank (4); a hole punched out at a center of the baffle plate, said hole having a diameter is ¼ to ½ of the diameter of the hollow cylinder of the bell-shaped reaction tank (4).

3. A reactor for resin ion exchange and adsorption as defined in either claim 2, wherein the turbine water-lifting agitator (5) consists of a turbine (7), an upper agitating propeller (8) and a lower agitating propeller (6); a motor for rotating the turbine and the upper agitating propeller and the lower agitating propeller; a rotation rate of the agitator is 20 to 50 rpm; the diameter of the turbine (7) is ¼ to ⅓ of the diameter of the hollow cylinder of the bell-shaped reaction tank (4); both the upper agitating propeller (8) and the lower agitating propeller (6) consist of 2 to 6 blades; a linear velocity at an edge of the turbine (7) is 0.1 to 1.5 m/s and a linear velocity at a tip of the blade of the upper agitator and a tip of the blade of the lower agitator is 0.2 to 2.0 m/s.

4. A reactor for resin ion exchange and adsorption as defined in claim 1, wherein the guide plate (9) is a hollow cylinder concentric with the reactor's main body (1); a diameter of the guide plate (9) is ½ to ⅔ of the diameter of the cylinder (3) of the reactor's main body (1); an upper end of the guide plate and an upper end of the cylinder (3) the reactor's main body (1) are positioned at the same elevation, and a lower end of the guide plate is 1.5-2.5 m above the a bottom of the reactor's main body (1).

5. A reactor for resin ion exchange and adsorption as defined in claim 1, wherein the outlet weir (12) consists of 4 to 12 weir units, installed like wheel spokes between the cylinder (3) of the main body (1) and the guide plate (9), wherein the weir units are 0.3 to 0.5 m below the upper end of the main body (1), and the weir units upper edges that are serrated.

6. A reactor for resin ion exchange and adsorption as defined in claim 1, wherein the inclined pipe separator (11) consists of a multiplicity of inclined pipes installed between the main body casing (1) of the reactor and the guide plate (9), 1.5 to 3.5 m below the an upper end of the cylinder (3) of the main body (1); a diameter of each inclined pipe is 50 to 80 mm; each pipe has a 45° to 60° inclination angle and is 0.8 m to 1.2 m in length; the inclined pipes are formed of one of polypropylene (PP), unplasticized polyvinyl chloride (UPVC), polyethylene (PE), and fiber-reinforced plastic, and a surface loading rate of the inclined pipe separator is 3 to 6 $m^3/(m^2 \cdot h)$.

7. A reactor for resin ion exchange and adsorption as defined in claim 1, wherein the circular resin-collecting sump (10) is 0.5 to 2.0 m above a bottom of main body (1) of the reactor; a height of the circular resin-collecting SUMP (10) is 0.5 to 1.0 m, and a width at an upper end of the circular resin-collecting SUMP (10) is ⅛ to ¼ of the diameter of the cylinder (3) of the main body (1).

\* \* \* \* \*

UNITED STATES PATENT AND TRADEMARK OFFICE
CERTIFICATE OF CORRECTION

PATENT NO.        : 8,864,987 B2                                 Page 1 of 1
APPLICATION NO.   : 14/117194
DATED             : October 21, 2014
INVENTOR(S)       : Chao Long et al.

It is certified that error appears in the above-identified patent and that said Letters Patent is hereby corrected as shown below:

In the Drawings

Page 3, add "Fig. 1" under drawing.

In the Claims

Column 8, Line 55, Claim 1, after "diameter", delete "is".

Column 9, Line 9, Claim 4, after "above", delete "the".

Column 10, Line 3, Claim 6, after "below", delete "the".

Signed and Sealed this
First Day of December, 2015

Michelle K. Lee
*Director of the United States Patent and Trademark Office*